(12) United States Patent
Nielsen (10) Patent No.: US 12,209,573 B2
(45) Date of Patent: Jan. 28, 2025

(54) WIND POWER PLANT

(71) Applicant: VESTAS WIND SYSTEMS A/S, Aarhus N. (DK)

(72) Inventor: Jesper Nielsen, Risskov (DK)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 58 days.

(21) Appl. No.: 17/911,095

(22) PCT Filed: Mar. 5, 2021

(86) PCT No.: PCT/DK2021/050067
§ 371 (c)(1),
(2) Date: Sep. 12, 2022

(87) PCT Pub. No.: WO2021/180280
PCT Pub. Date: Sep. 16, 2021

(65) Prior Publication Data
US 2023/0143859 A1 May 11, 2023

(30) Foreign Application Priority Data
Mar. 10, 2020 (DK) .................... PA 2020 70163

(51) Int. Cl.
*H02J 3/38* (2006.01)
*F03D 9/25* (2016.01)
*F03D 13/25* (2016.01)

(52) U.S. Cl.
CPC ............ *F03D 9/257* (2017.02); *F03D 13/25* (2016.05); *H02J 3/381* (2013.01); *F05B 2240/95* (2013.01); *H02J 2300/28* (2020.01)

(58) Field of Classification Search
CPC .......... F03D 9/257; F03D 13/25; F03D 80/00; H02J 3/381; H02J 2300/28;
(Continued)

(56) References Cited

U.S. PATENT DOCUMENTS 7,880,335 B2    2/2011  Altenschulte
2010/0033016 A1*  2/2010  Thorburn ................ H02J 3/381
                                                                  307/80

(Continued)

FOREIGN PATENT DOCUMENTS

CN    206977064 U    2/2018
CN    108258727 A    7/2018
(Continued)

OTHER PUBLICATIONS

Danish Patent and Trademark Office, 1st Technical Examination Including the Search Report and Search Opinion for Application PA 2020 70163 dated Sep. 25, 2020.
(Continued)

*Primary Examiner* — Lincoln D Donovan
*Assistant Examiner* — Alex W Lam
(74) *Attorney, Agent, or Firm* — Patterson + Sheridan, LLP (57) ABSTRACT

The invention concerns a wind power plant comprising a plurality of wind turbines connected to a distribution line; a connection station comprising a plurality of switchgear devices connected to a substation via the distribution line; and, a plurality of power cables connecting the plurality of switchgear devices and the plurality of wind turbines. The plurality of power cables are respectively arranged to connect a single switchgear device of the plurality of switchgear devices and a single wind turbine of the plurality of wind turbines.

20 Claims, 9 Drawing Sheets (58) Field of Classification Search
CPC ..... F05B 2240/95; Y02B 10/30; Y02E 10/72; Y02E 10/727; Y02E 10/76
See application file for complete search history.

(56) References Cited

U.S. PATENT DOCUMENTS

| | | |
|---|---|---|
| 2011/0006538 A1 | 1/2011 | Fischer et al. |
| 2015/0152850 A1* | 6/2015 | Nielsen .................. F03D 80/82 307/85 |
| 2017/0018961 A1* | 1/2017 | Rosenvard ............ F03D 7/0204 |
| 2020/0370537 A1* | 11/2020 | Hospers .................. F03D 9/257 |

FOREIGN PATENT DOCUMENTS

| | | |
|---|---|---|
| CN | 207926194 U | 9/2018 |
| EP | 2919353 A1 | 9/2015 |
| WO | 2009003508 A1 | 1/2009 |
| WO | 2019137639 A1 | 7/2019 |
| WO | 2021180280 A1 | 9/2021 |

OTHER PUBLICATIONS

PCT, International Search Report for Application PCT/DK2021/050067 dated May 28, 2021.
PCT, Written Opinion of The International Searching Authority for Application PCT/DK2021/050067 dated May 28, 2021.
European Patent Office, Communication pursuant to Article 94(3) EPC for European Patent Application No. 21712957.6, dated Jul. 18, 2024.

* cited by examiner

WIND POWER PLANT

FIELD OF THE INVENTION

This invention generally concerns a wind power plant and in particular arrangements for connecting wind turbines forming the wind power plant.

BACKGROUND

Conventionally, wind power plants comprise multiple wind turbines connected to each other by cable array arranged in a string configuration. In such configuration, a whole of a serial array power cables connecting the turbines is most frequently sized for the combined power of all turbines in the serial cable array. Sometimes it has been chosen to decrease a cross-sectional area of one or more of the connections between end-most turbines, or e.g. between the second last turbine and the last turbine of such string or serial array cable.

STATEMENTS OF INVENTION

It may be seen as an object of the invention to provide an improved wind power plant. In particular, it may be seen as an object to provide a solution which decreases one or more or all of a cost of designing the wind power plant, a cost of materials and equipment used in the wind power plant, a cost of commissioning the wind power plant, a cost of maintaining the wind power plant—while maintaining or increasing a life time of the wind power plant and maintaining or increasing a power production of the wind power plant.

Preferably, the invention alleviates, mitigates or eliminates one or more of the above or other disadvantages singly or in any combination.

According to an aspect of the invention, there is provided a wind power plant comprising a plurality of wind turbines connected to a distribution line; a connection station comprising a plurality of switchgear devices connected to a substation via the distribution line; and, a plurality of power cables connecting the plurality of switchgear devices and the plurality of wind turbines, wherein the plurality of power cables are respectively arranged to connect a single switchgear device of the plurality of switchgear devices and a single wind turbine of the plurality of wind turbines.

Thus, an improved wind power plant is provided. It may be seen as an advantage of the invention that a cost of materials and equipment used in the wind power plant is decreased; This may be seen to be due to the insight as disclosed and claimed herein that a connection station and internal grid layout in the wind power plant as described is of benefit.

Optionally, the connection station further comprises a primary switchgear device connecting the plurality of switchgear devices and the distribution line. The primary switchgear device provides an indirect connection between the plurality of switchgear devices and distribution line and enables all of the wind turbines that are coupled to the connection station to be simultaneously connected or disconnected from the wind power plant.

Optionally, at least one wind turbine of the plurality of wind turbines comprises a connection box and wherein at least one power cable of the plurality of power cables directly connects a single switchgear device of the plurality of switchgear devices and the at least one wind turbine via the connection box. The connection box may provide a ground or earthing point for the wind power plant within each wind turbine. Moreover, the presence of connection boxes is also beneficial as a connection point for commissioning and/or testing the wind power plant, during which the wind turbine are often not present and are mounted only after the commissioning and/or testing is complete.

Optionally, at least one wind turbine of the plurality of wind turbines comprises a switchgear device and wherein at least one power cable of the plurality of power cables directly connects a single switchgear device of the plurality of switchgear devices and the at least one wind turbine via the switchgear device. This arrangement makes use of a known wind turbine configuration while still drawing the benefits of using the connection station.

Optionally, the connection station further comprises a step-up transformer connecting the plurality of switchgear devices and the distribution line. This enables the power equipment in the wind turbines to have a lower rating.

Optionally, the step-up transformer is rated at 66 kV or greater.

Optionally, the power equipment in the plurality of wind turbines is rated at 36 kV or lower. The fact that the power equipment can be rated at 36 kV or lower means that its size and cost can be reduced comparative to conventional power equipment. Reducing the size of the power equipment is particularly advantageous as it enables the size of the tower door, which provides access to the interior of the tower, to be reduced which, in turn, improves its structural response to loads acting on the tower. Reducing the size of the power equipment also provides the additional advantage of increasing the available space within the tower, meaning that it could be repurposed as, for example, storage space.

Optionally, at least one power cable of the plurality of power cables directly connects a single switchgear device of the plurality of switchgear devices and a generator of a wind turbine of the plurality of wind turbines such that an AC output from the generator is transferred untransformed to the step-up transformer. Alternatively, the wind turbines each may have respective power converters positioned between the generators and respective switchgear devices on the connection station, allowing the generator to deliver as high voltage as possible (e.g. over 1 kV).

Optionally, each power cable comprises three cores with a cross-sectional area of e.g. 0.000095 m$^2$, 0.00012 m$^2$ or 0.00015 m$^2$. The fact that the power cables have a comparatively smaller cross-sectional area when compared with known power cable means that they use less material, which reduces cost.

Optionally, the connection station further comprises an auxiliary power supply configured to supply power to at least one wind turbine of the plurality of wind turbines. The auxiliary power supply may be used to power the wind turbines before they are fully commissioned and/or under certain start-up conditions.

Optionally, the wind power plant is an offshore wind power plant and wherein the connection station is located on a floating platform. This arrangement provides straightforward transportation of the connection station as necessary.

Alternatively, the wind power plant is an offshore wind power plant and wherein the connection station is located on a monopile or a jacket comprising three or four anchoring points. This arrangement makes use of existing infrastructure.

Optionally, the plurality of power cables each comprise a communication line configured to send control signals to its respective switchgear device.

Optionally, the communication lines are fibre optic cables, ensuring fast communication between the wind turbines and their respective circuit breaker panels.

According to another aspect of the invention, there is provided a connection station comprising a plurality of switchgear devices for use in a wind power plant according to the previous aspect.

BRIEF DESCRIPTION OF THE DRAWINGS

The above and other aspects of the invention will now be described, by way of example only, with reference to the accompanying drawings, in which.

In the drawings, like features are denoted by like reference signs where appropriate.

SPECIFIC DESCRIPTION

Specific embodiments of the invention will now be described in which numerous features will be discussed in detail in order to provide a thorough understanding of the inventive concept as defined by the appended claims. However, it will be apparent to the skilled reader that the invention may be put in to effect without the specific details and that, in some instances, well known methods, techniques and structures have not been described in detail in order not to obscure the inventive concept unnecessarily.

Figure 1:
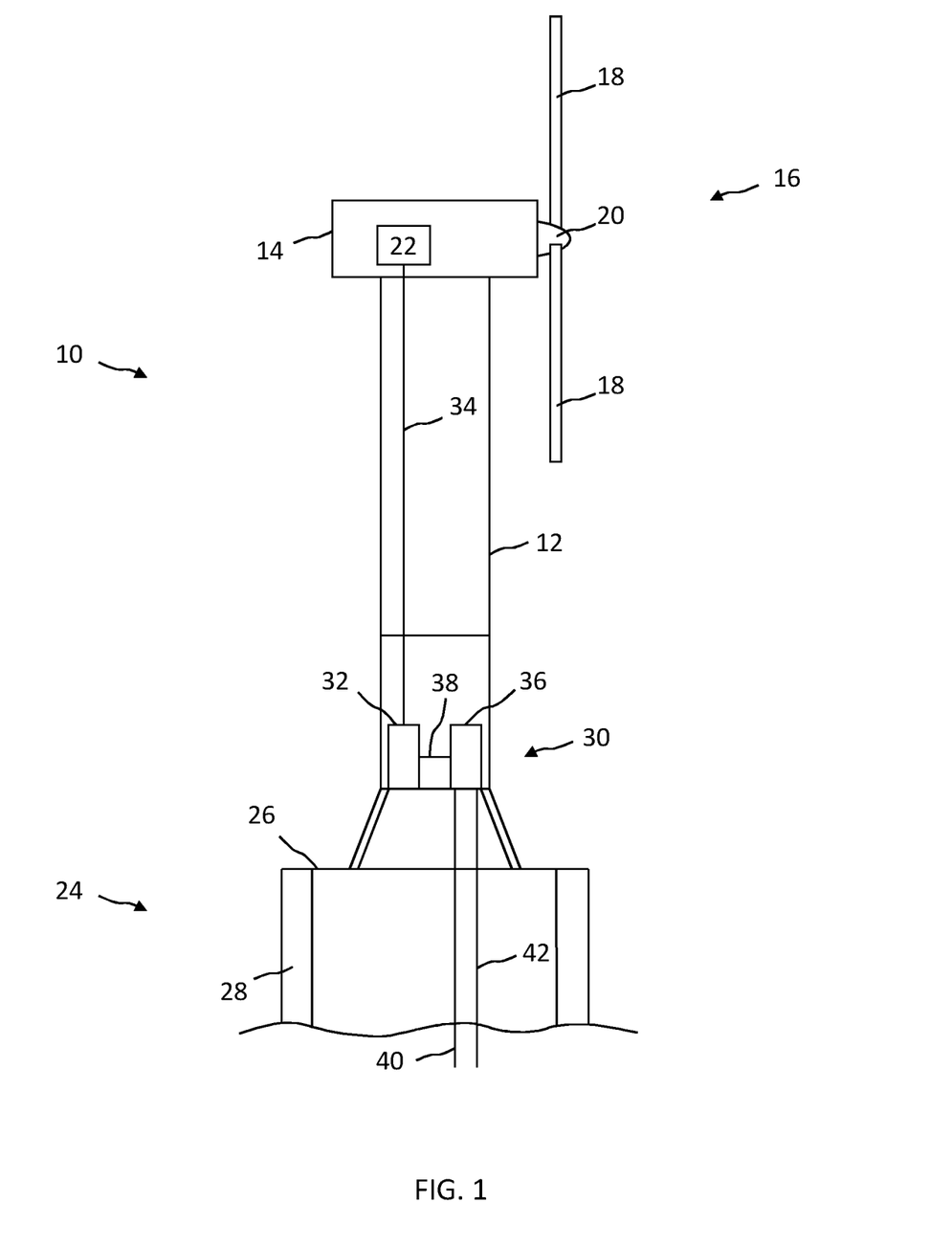
FIG. 1 is a schematic view of a known wind turbine.

FIG. 1 shows a known wind turbine, generally designated by 10. In this particular example, the wind turbine 10 is an off-shore wind turbine and the skilled reader will understand that the general arrangement of a wind turbine is the same regardless of whether it is an off- or on-shore wind turbine. In this instance, the wind turbine 10 is a three-bladed upwind horizontal-axis wind turbine, which is the most common type of wind turbine in use. The wind turbine 10 comprises a tower 12 supporting a nacelle 14, to which a rotor 16 is mounted. The rotor 16 comprises a plurality of rotor blades 18 extending radially from a central hub 20. In this example, the rotor 16 comprises three rotor blades 18, although only two are visible because of the orientation of the wind turbine 10. However, it will be apparent to the skilled reader that other rotor 16 configurations are possible. The rotor 16 is operatively coupled to a power generation system, represented schematically by box 22, housed inside the nacelle 14. The power generation system 22 comprises a generator, arranged to be driven by the rotor 16 to produce electrical power, and a power converter system, which converts the electrical power outputted from the generator into a form suitable for delivery to an electrical grid (not shown). In addition to the power generation system 22, the nacelle 14 and the tower 12 house miscellaneous components required for converting wind energy into electrical energy, along with various other components needed to operate, control and optimise the performance of the wind turbine 10.

The wind turbine 10 is located on an offshore foundation in the form of a monopile 24. In this example, the monopile 24 includes a platform 26 that is supported on a plurality of pillars 28 that are piled into the seabed. A transition piece 30 is provided on the platform 26, positioned below and arranged to carry the wind turbine 10.

A coupling transformer 32, which acts to suitably couple the power generation system 22 to a grid transmission or distribution line (not shown), is located inside the transition piece 30 and is operatively connected to the power generation system 22 via a set of conductor lines 34 that extend inside the tower 12. A switchgear device 36, comprising a circuit breaker panel for isolating the electrical equipment inside the wind turbine 10 in the event of a fault condition, is also located in the transition piece 30, and is connected to the coupling transformer 32 via a set of power cables or busbar 38.

In addition to the circuit breaker panel, the switchgear device 36 comprises a high-voltage joint associated with an incoming array cable 40 and an outgoing array cable 42. The busbar 38, power generation system 22, set of conductor lines 34, coupling transformer 32 and switchgear device 36 all form part of the power equipment of the wind turbine 10, together with any other miscellaneous components required for converting wind energy into electrical energy.

Figure 2:
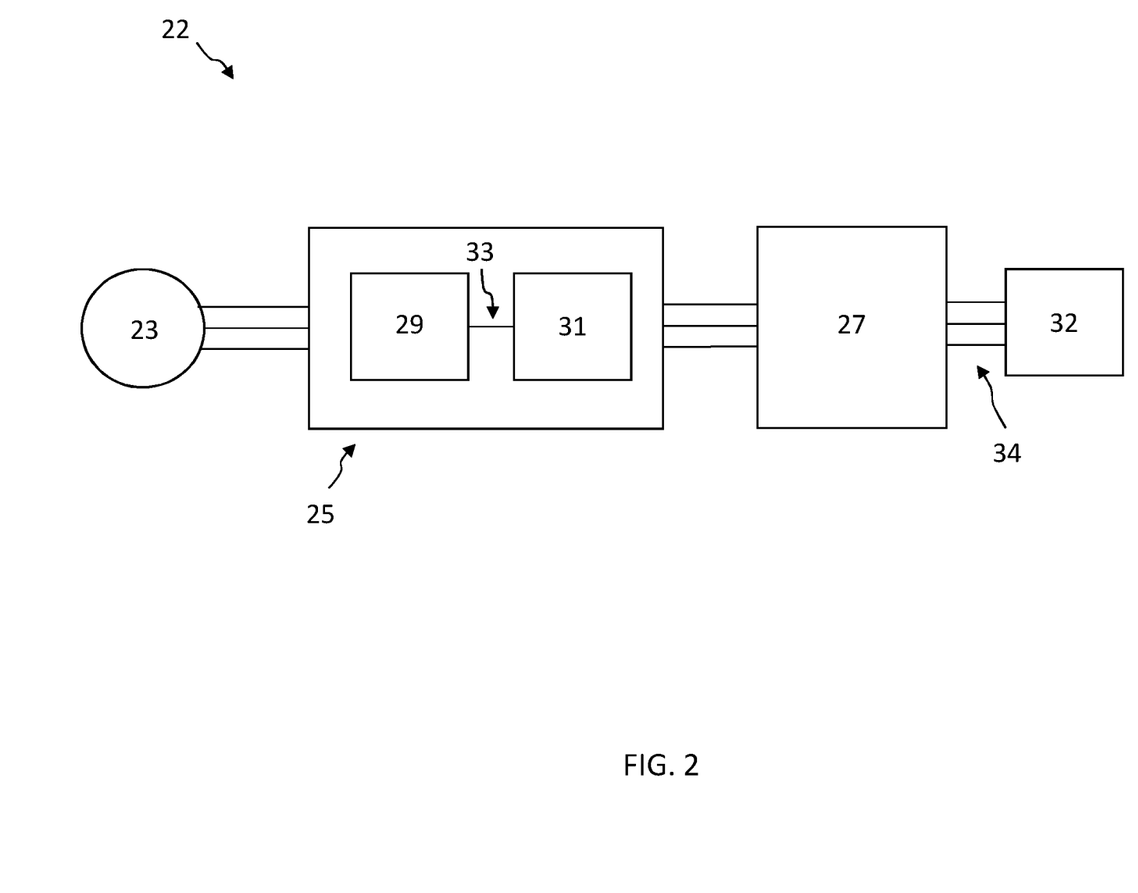
FIG. 2 is a schematic systems view of a power generation system for use in the wind turbine of FIG. 1.

The components of the power generation system 22 of the wind turbine 10, as shown in FIG. 2, are conventional and, as such, will be familiar to the skilled reader, and so will only be described in overview. Moreover, it should be noted that the example of the power generation system 22 shown in FIG. 2 is representative only, and the skilled reader will appreciate that the invention may be applicable to many different configurations and is not limited to a particular convertor architecture. As already noted, the power generation system 22 comprises the generator 23, driven by the rotor 16 (not shown in FIG. 2) to produce electrical power, along with a low voltage link defined by the set of conductor lines 34 terminating at the coupling transformer 32. The power generation system 22 also includes a power converter system 25, together with a filter 27, disposed between the generator 23 and the coupling transformer 32, to process the output of the generator 23 into a waveform having a suitable frequency and an appropriate phase angle.

The power converter system 25 provides AC to AC conversion by feeding electrical current through a generator side converter 29 followed by a line side converter 31 in series for converting AC to DC and DC to AC respectively. The generator side converter 29 is connected to the line side converter 31 by a DC link 33, providing smoothing for the DC output of the generator side converter 29. The smoothed DC output of the generator side converter 29 is received as a DC input by the line side converter 31, which creates a three-phase AC output for delivery to the coupling transformer 32. The filter 27 provides low-pass filtering for removing switching harmonics from the AC waveform.

Figure 3:
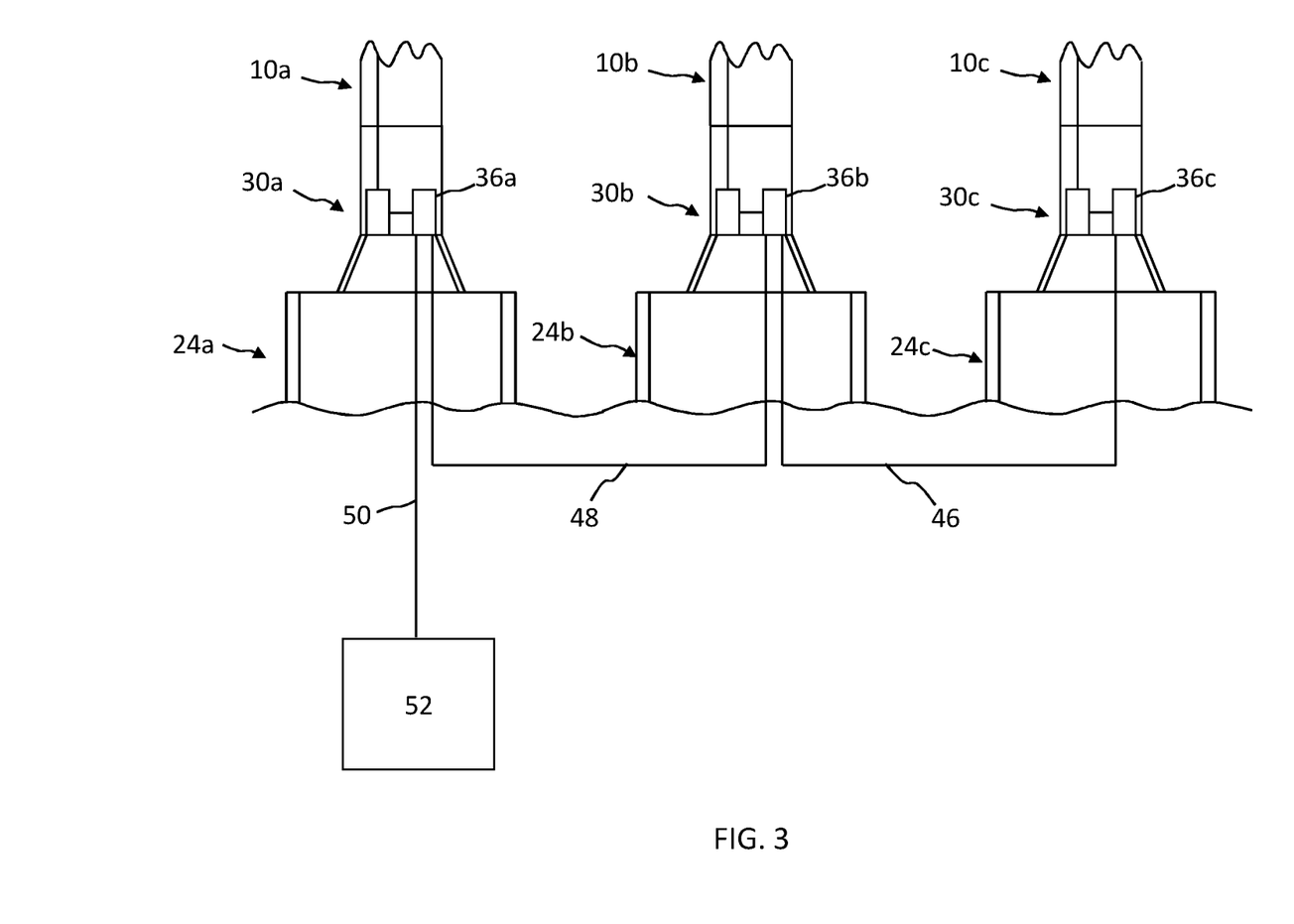
FIG. 3 is a schematic view of a known wind power plant comprising an array of wind turbines of FIG. 1.

Although the wind turbine 10 has been described individually up to this point, it would typically form part of an offshore wind power plant 44 comprising a plurality of wind turbine that are electrically connected together via a cable array, as shown in FIG. 3.

The wind power plant 44 of FIG. 3 comprises a plurality of wind turbines 10a-10c, together with their respective monopiles 24a-24c and transition pieces 30a-30c. In this example, three wind turbines 10a-10c are shown, but the skilled reader will appreciate that there would normally be many more than this in a typical wind power plant, ranging from 10s to 100s of wind turbines. The transition pieces 30a-30c, containing respective switchgear devices 36a-36c, are installed prior to the installation of the wind turbines 10a-10c. This arrangement allows array cables 46, 48, 50 forming the cable array to be connected, in an end-to-end or string configuration, and tested prior to installing the wind turbines 10a-10c. In this example, array cable 46 performs the functions of an outgoing array cable for transition piece 30c and an incoming array cable for transition piece 30b, and array cable 48 performs the functions of an outgoing array cable for transition piece 30b and an incoming array cable for transition piece 30a. Array cable 50, associated with the first transition piece 30a, connects the other array cables 46, 48 to a substation 52, which is arranged to supply electrical power to the grid distribution or transmission line (not shown). Although not represented in FIG. 3, the substation 52 would typically include its own switchgear device comprising a circuit breaker panel, allowing it to be connected to or disconnected from the wind power plant 44 as required.

The string configuration of the array cables 46, 48, 50 means that the first array cable, connecting the plurality of wind turbines 10a-10c to the substation 52, which in this example is array cable 50, must be sufficiently rated so as to carry electric current from each of the wind turbines 10a-10c. Whereas the final array cable in the string configuration, which in this example is array cable 46, need only carry electric current from a single wind turbine 10c. This affords an opportunity to reduce the cross-sectional area of array cables the further along the string configuration they are from the substation 52, comparative to those array cables that are closer to the substation 52 within the string configuration, and so are required to carry electric current from multiple wind turbines 10. Typically, in such an arrangement, the first and last power cables might have cross-sectional areas of approximately 630 mm$^2$ (0.00063 m$^2$) and 240 mm$^2$ (0.00024 m$^2$) respectively, with the cross-sectional area of any intermediate array cables, represent in this example by power cable 48, being somewhere between these values depending on how much electric current they are required to carry. However, in practice, in order to ensure that the array cables are sufficiently rated for their purpose and by reason of the economics of utilising array cables with differing cross-sectional areas, all array cables tend have the larger of the cross-sectional areas referred to above, regardless of their position within the string configuration.

Another significant drawback of using a cable array having a string or serial configuration is that in the unlikely event of a breakage in the cable array, this renders all of the other wind turbines within the cable array unusable, which when scaled up across the wind power plant, can result in a significant loss in energy production.

Figure 4:
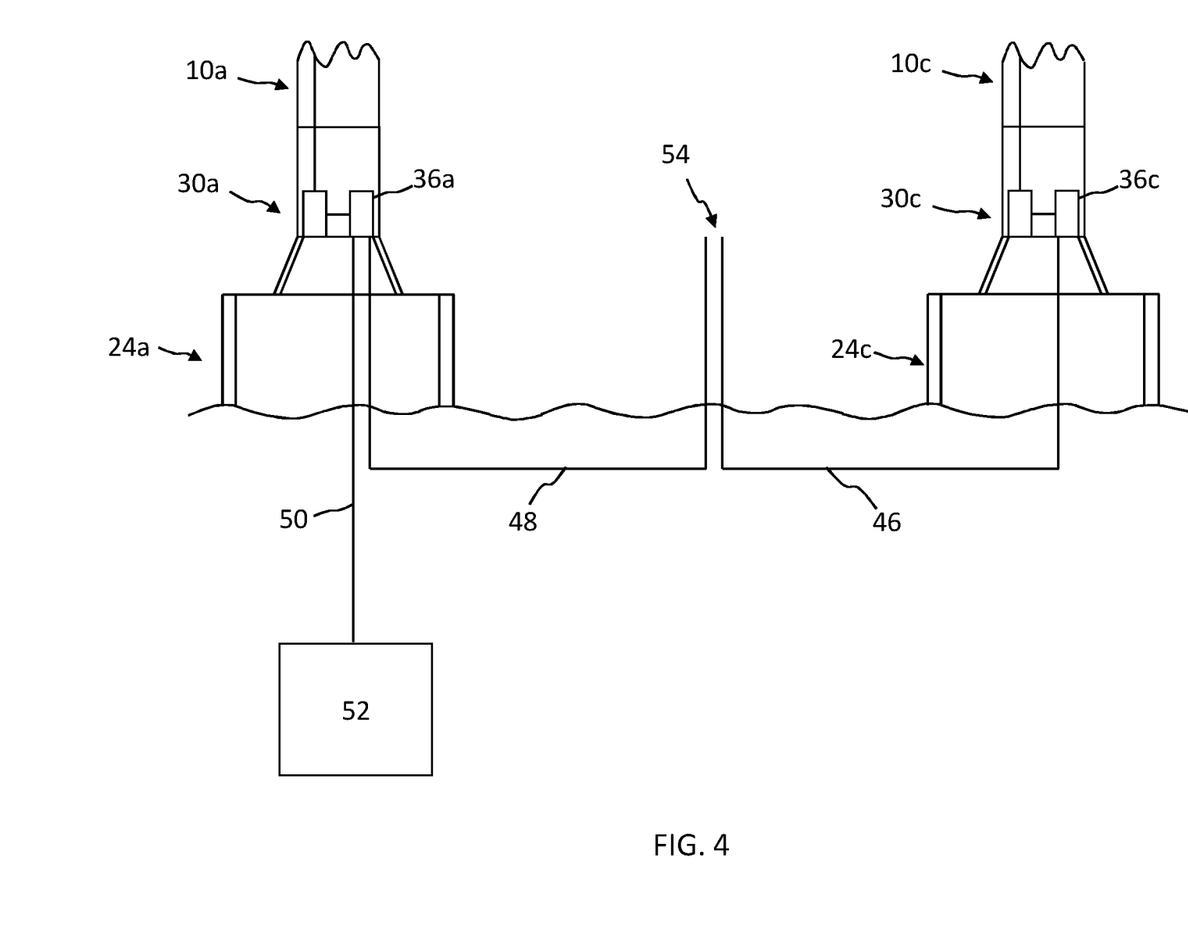
FIG. 4 is a schematic view of the known wind power plant of FIG. 3 showing a break in a cable array.

Especially for an off-shore site and if e.g. a floating wind turbine needs to removed from the other wind turbines for reasons of maintenance, repair or similar, the array cables associated with the one wind turbine form a break in the cable array. This renders all of the other wind turbines within the cable array unusable, which when scaled up across the wind power plant, can result in a significant loss in energy production. This situation is illustrated in FIG. 4, where the wind turbine 10b has been removed, along with its associated transition piece 30b and monopile 24b, leaving a break 54 in the cable array. Such an operation can result is a significant loss in energy production when scaled up across an wind power plant comprising 10s or 100s of wind turbines. An electrical joint could be used at the break 54 to temporarily connect the power cables 46, 48, meaning that the remaining wind turbines 10a, 10c could be used in the absence of the removed wind turbine 10b, but this poses a laborious undertaking, most particularly when considered across a large offshore wind power plant. Thus, in conclusion, possible disadvantages of the disclosed solutions are among others that special design considerations may have to be carried out with respect to cable sizing, and/or certain internal grid layouts may become rather expensive in terms of a cost of their power equipment. Thus, various disadvantages of existing internal grid designs have hereby been disclosed, and it is against this background that the invention has been devised.

Figure 5:
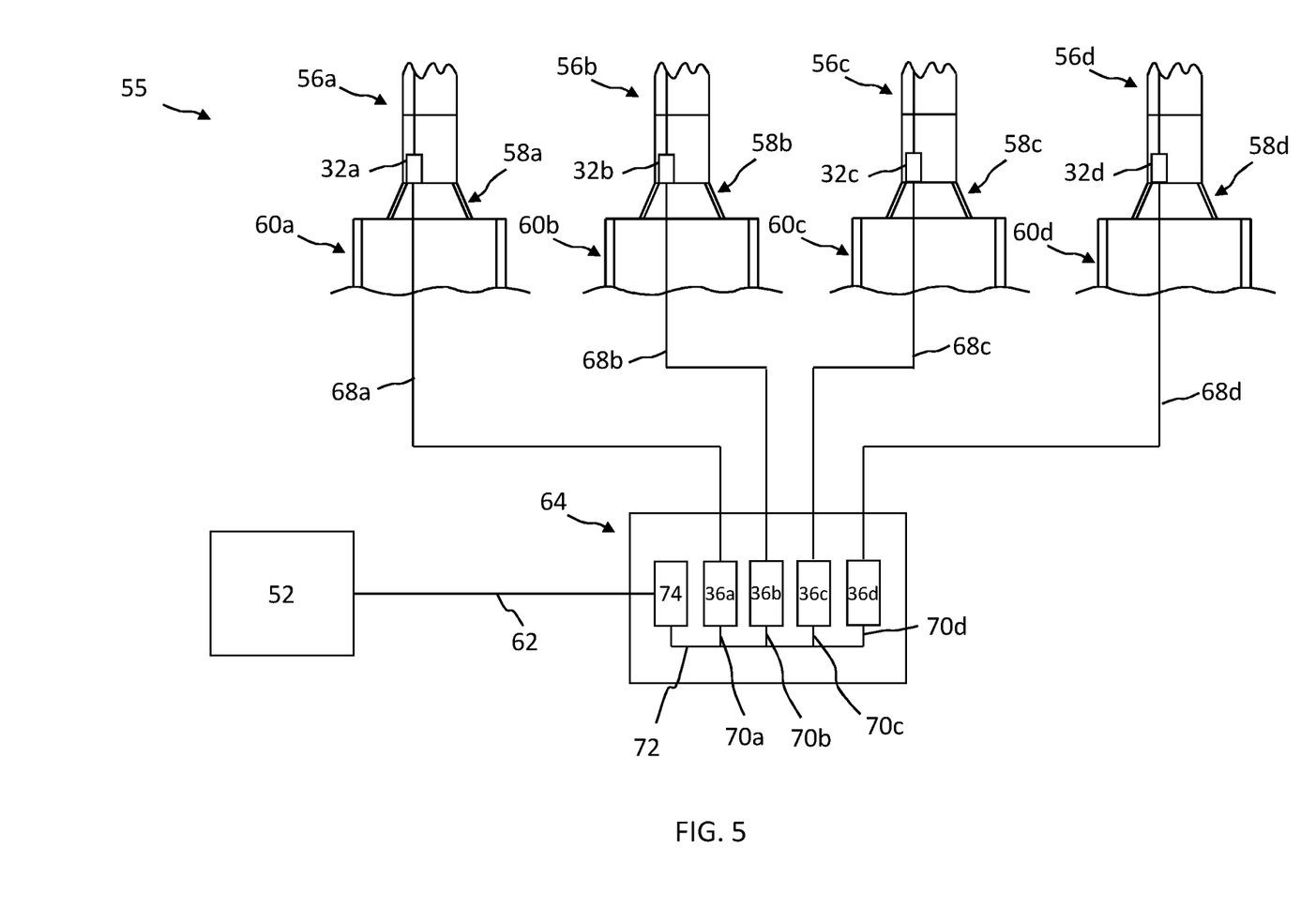
FIG. 5 is a schematic view of a wind power plant according to an embodiment of the invention.

FIG. 5 shows a wind power plant 55 according to an embodiment of the invention. For reasons of consistency with the preceding figures, an off-shore wind power plant is illustrated in FIG. 5 but the skilled reader will understand that the invention, as set out by the appended claims, is not limited only to off-shore wind power plants but could also be used for on-shore wind power plants. The wind power plant 55 comprises a plurality of wind turbines, which in this embodiment is represented by four wind turbines 56a-56d, along with their respective transition pieces 58a-58d and monopiles 60a-60d. As with the example of the known wind power plant shown in FIG. 3, the skilled reader will appreciate that, in practice, the wind power plant 55 of this embodiment of the invention could comprise many more wind turbines, ranging from 10s to 100s of wind turbines. The wind turbines 56a-56d are the same as the known wind turbines 10a-10d in most aspects, in that they comprise a rotor operatively coupled to a power generation system housed with a nacelle. The power generation system comprises a generator driven by the rotor and a power converter system for converting electrical power outputted from the generator into a form suitable for delivery to an electrical grid. The transition pieces 58a-58d each include a coupling transformer 32a-32d, suitably coupling the power generation system to a distribution line 62, and the various miscellaneous components required for converting wind energy into electrical energy, along with other components required to operate, control and optimise the performances of the wind turbines 56a-56d are of course also included. However, the wind turbines 56a-56d of this embodiment of the invention differ from known wind turbines 10a-10d in that they do not include a switchgear device including a circuit breaker panel. Instead, the wind power plant 55 comprises a connection station, generally designated by 64, comprising a plurality of switchgear devices 36a-36d connected to a substation 52 by the distribution line 62. Not having switchgear in the wind turbines 56a-56d is advantageous because it can make the process of constructing the wind power plant 55 more straightforward insofar that, in the absence of any switchgear, the transition pieces 58a-58d can be made as single pieces being comparatively smaller and lighter, making their transportation easier. As this embodiment relates to an off-shore wind power plant 55, the connection station 64 may be located on a monopile or a jacket comprising three or four anchoring points which has been vacated by a wind turbine, making use of existing infrastructure, or on a floating platform, providing straightforward transportation of the connection station 64 for reasons of maintenance or repair, or any other reason. In this embodiment, the connection station 64 includes four switchgear devices 36a-36d, one for each wind turbine 56a-56d, providing one-to-one relationship between the wind turbines 56a-56d and switchgear devices 36*a*-36*d*. The wind power plant 55 comprises a plurality of power cables arranged in a parallel configuration to electrically connect the switchgear devices 36*a*-36*d* and coupling transformers 32*a*-32*d*. In this embodiment of the invention, the plurality of power cables comprises four power cables 68*a*-68*d*, each one of which connecting one of the switchgear devices 36*a*-36*d* to one of the coupling transformers 32*a*-32*d*, The switchgear devices 36*a*-36*d* each comprises respective outgoing power cables 70*a*-70*d* that are connected to each other by a busbar 72, which is itself connected to the distribution line 62. In this embodiment of the invention, and in the following and other embodiments, the connection between the busbar 72 and distribution line 62 may be a direct connection or alternatively the connection station 64 comprises a primary switchgear device 74, as shown in FIG. 5. The primary switchgear device 74 provides an indirect connection between the switchgear devices 36*a*-36*d* and distribution line 62 and enables all of the wind turbines 56*a*-56*d* that are coupled to the connection station 64 to be simultaneously connected or disconnected from the wind power plant 55.

Figure 6:
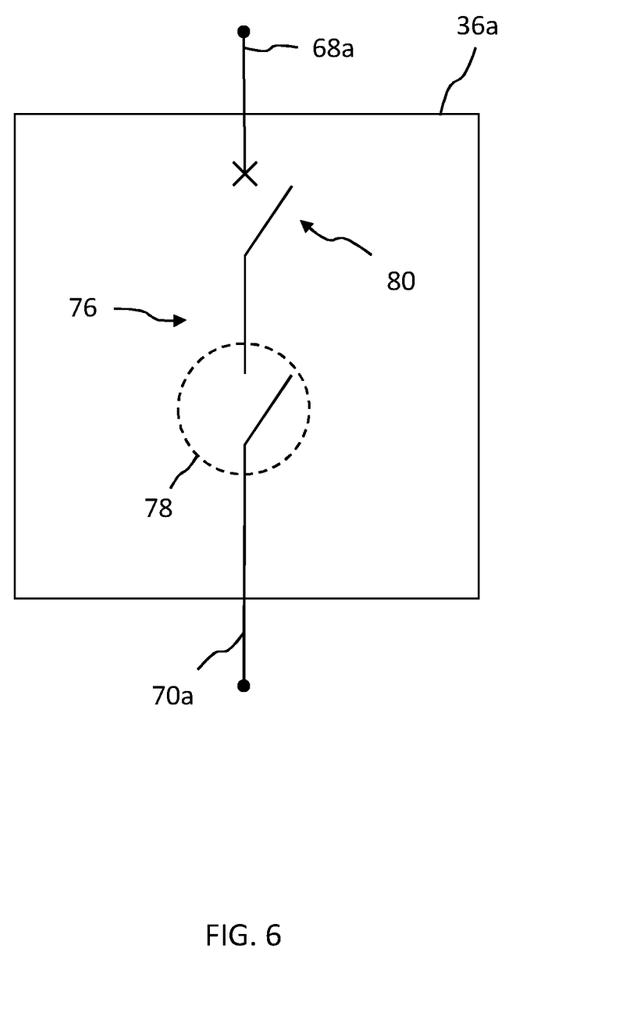
FIG. 6 is a schematic view of a switchgear device used in the wind power plant of FIG. 5.

FIG. 6 is a schematic view of one of the switchgear devices 36*a*-36*d* shown in FIG. 5. In this instance, only switchgear device 36*a* is shown but it should be understood that, in this embodiment of the invention, the remaining switchgear devices 36*b*-36*d* and the primary switchgear device 74 have the same configuration. The switchgear device 36*a* includes a high-voltage joint, generally designated by 76, comprising a switch assembly 78 associated with the outgoing power cable 70*a*, together with a circuit breaker panel 80 for protecting the one or more coupling transformers 32*a* to which the switchgear device 36*a* is connected. This arrangement, in addition to facilitating the testing of the outgoing power cables 70*a* prior to installation of the wind turbine 56*a*, also enables the wind turbine 56*a* to be de-energised by disconnecting it from the wind power plant 55, for example when service operations on the wind turbine 56*a* are undertaken. In situations in which the wind turbine 56*a* needs to be altogether removed or electrically disconnected from the wind power plant 55, in the event of a fault, for example, the fact that the plurality of power cables 68*a*-68*d* are arranged in a parallel configuration, connecting a single switchgear device 36*a*-36*d* to a single wind turbine 56*a*-56*d*, means that the wind turbine 56*a* is electrically isolated from the other wind turbines 56*b*-56*d* such that it can be disconnected from the connection station 64 without shutting down other wind turbines 56*b*-56*d*. Accordingly, the wind power plant 55 does not bear a disproportionate loss in energy production compared to the number of wind turbines 56*a*-56*d* being disconnected therefrom.

The parallel configuration of the power cables 68*a*-68*d*, connecting a switchgear device 36*a*-36*d* and a respective wind turbine 56*a*-56*d* in a one-to-one relationship, also means that each power cable 68*a*-68*d* is only required to carry an electric current from a single wind turbine 56*a*-56*d*. This is opposed to the situation illustrated in FIG. 3 where array cable 50, for example, is required to carry electric current from multiple wind turbines 10*a*-10*c* connected serially, and so has to be rated accordingly, typically requiring a cross-sectional area of approximately 630 mm². However, because each power cable 68*a*-68*d* in this and other embodiments of the invention is required to carry an electric current from a single wind turbine 56*a*-56*d*, their respective cross-sectional areas can be comparatively smaller at around 240 mm². Alternatively, each power cable 68*a*-68*d* comprises three cores having cross-sectional areas of around 95 mm² (000095 m²), 120 mm² (0.00012 m²) or 150 mm² (0.00015 m²), any one of which might be used to carry an electric current from a single wind turbine 56*a*-56*d*. This affords the opportunity not only to reduce the overall cost of the wind power plant 55, through using less material, but also reduces the complexity of the network of power cables 68*a*-68*d*, making the processes of commissioning and maintaining the wind power plant 55 comparatively more straightforward.

Figure 7:
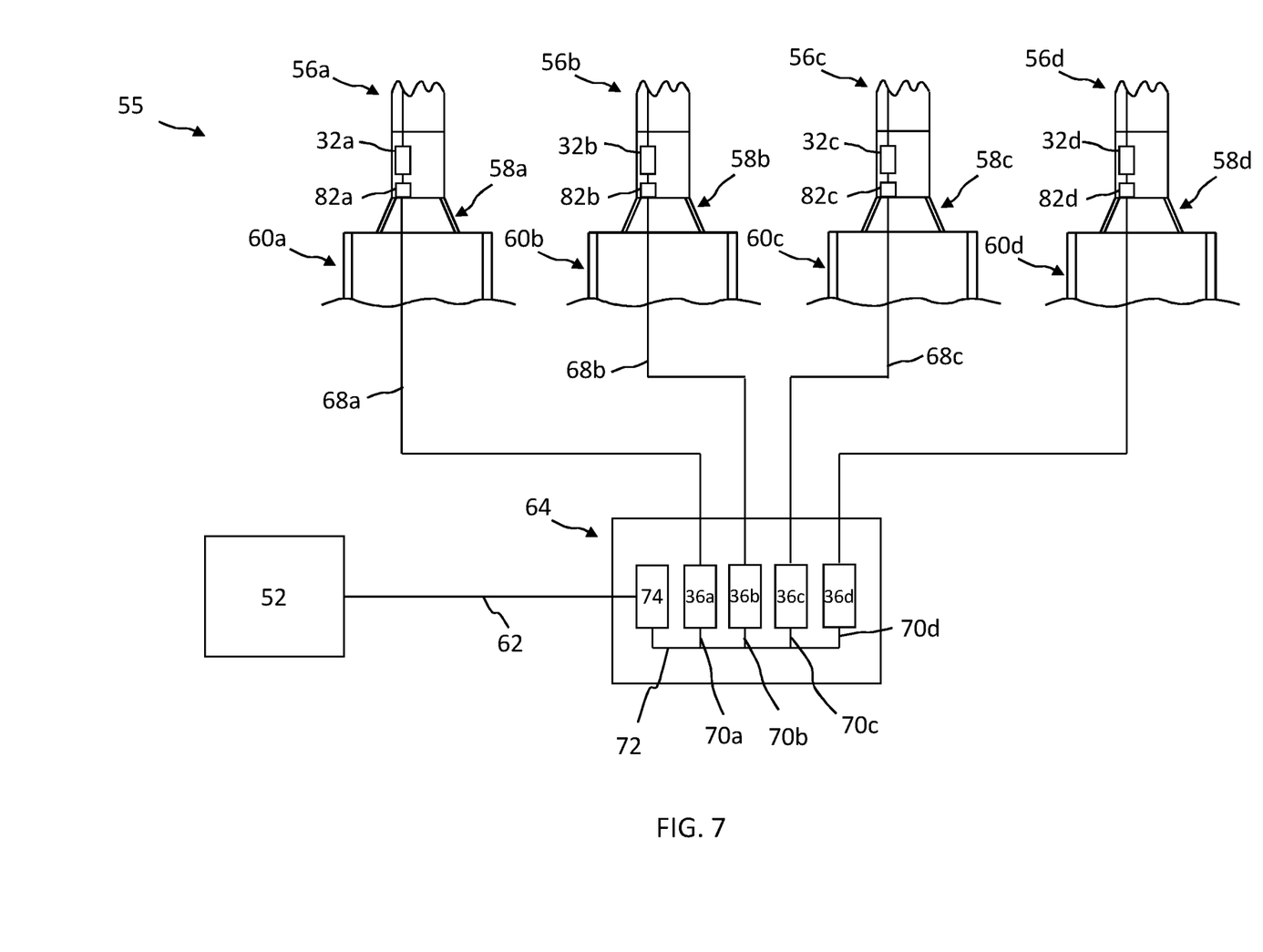
FIG. 7 is a schematic view of a wind power plant according to another embodiment of the invention.

FIG. 7 shows a wind power plant 55 according another embodiment of the invention. This embodiment is largely the same as the previous embodiment shown in FIG. 5 save that the wind turbines 56*a*-56*d* further comprise a connection box 82*a*-82*d* housed within their transition pieces 58*a*-58*d*. The connection boxes 82*a*-82*d* may comprise a high-voltage joint between respective coupling transformers 32*a*-32*d* and power cables 68*a*-68*d*, and may provide a ground or earthing point for the wind power plant 55 within the wind turbines 56*a*-56*d*. Moreover, the inclusion of connection boxes 82*a*-82*d* is also beneficial as a connection point when commissioning and/or testing the wind power plant 55, during which the wind turbine 56*a*-56*d* are often not present and are mounted only after the commissioning and/or testing is complete.

Figure 8:
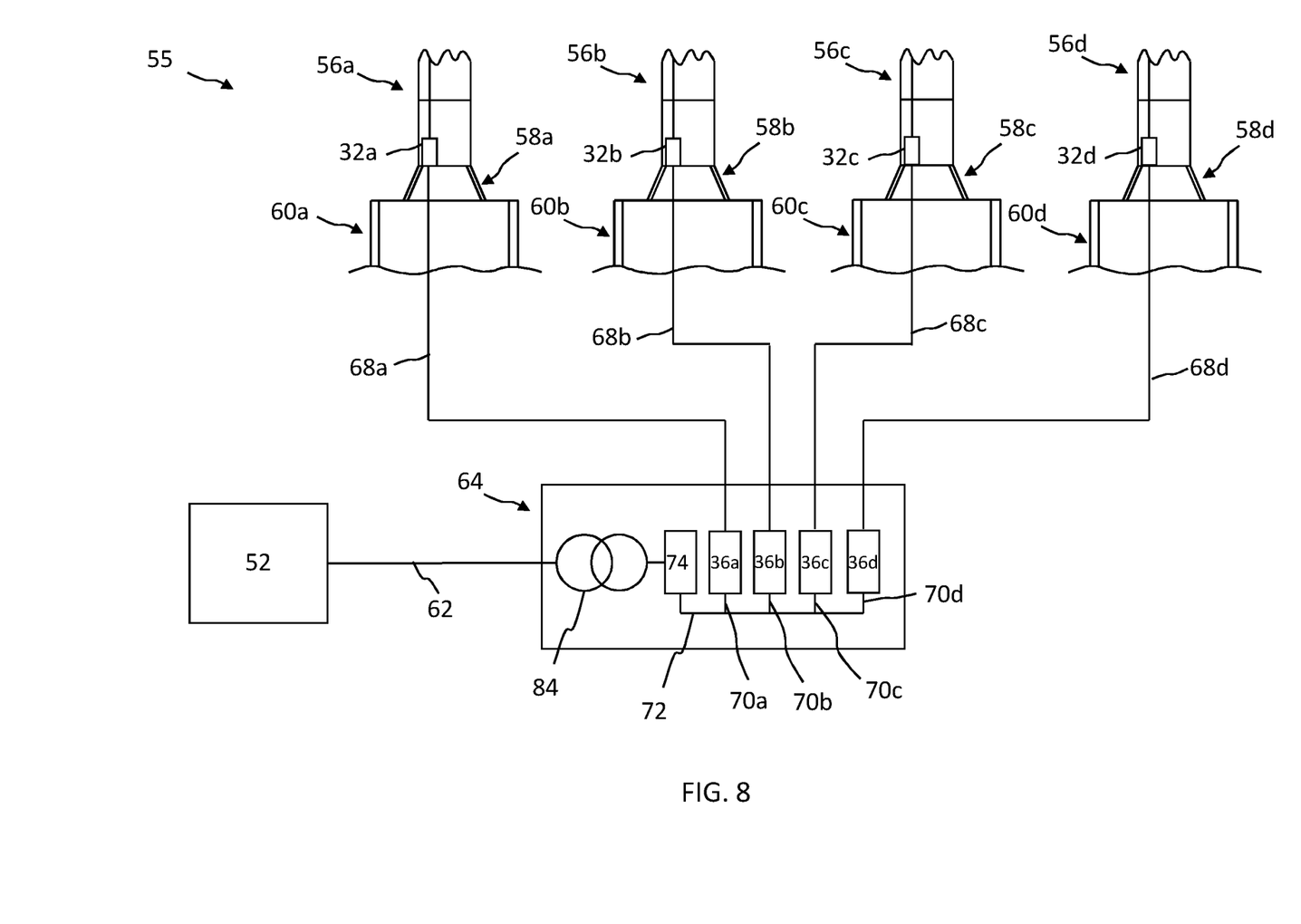
FIG. 8 is a schematic view of a wind power plant according to yet another embodiment of the invention; and, FIG. 9 is a schematic view of a wind power plant according to yet another embodiment of the invention.

FIG. 8 shows a wind power plant 55 according to another embodiment of the invention. This embodiment is largely the same as the embodiment shown in FIG. 5 except that the connection station 64 further comprises a step-up transformer 84 connected to the substation 52 via the distribution line 62. In one example, the step-up transformer 84 is rated at 66 kV or greater. For example, the step-up transformer 84 may be rated at 132 kV or greater, meaning that the power equipment within the wind turbines 56*a*-56*d* themselves does not need to be equivalently rated, but can instead have a low rating, such as for example 36 kV or lower, reducing the cost, size and/or complexity of the power equipment. For example, the power equipment within the wind turbines 56*a*-56*d* may be rated at 1 kV, 3.3 kV, 7.4 kV, 10 kV, 15 kV, 16 kV, 24 kV or 33 kV. Reducing the size of the power equipment is particularly advantageous as it enables the size of the tower door, which provides access to the interior of the tower, to be reduced which, in turn, improves its structural response to loads acting on the tower. Reducing the size of the power equipment also provides the additional advantage of increasing the available space within the tower, meaning that it could be repurposed as, for example, storage space. In particular, lower rated power equipment is far cheaper than higher rated power equipment. Further, centralizing higher rated power equipment means lowering a number of such higher rated power equipment.

Figure 9:
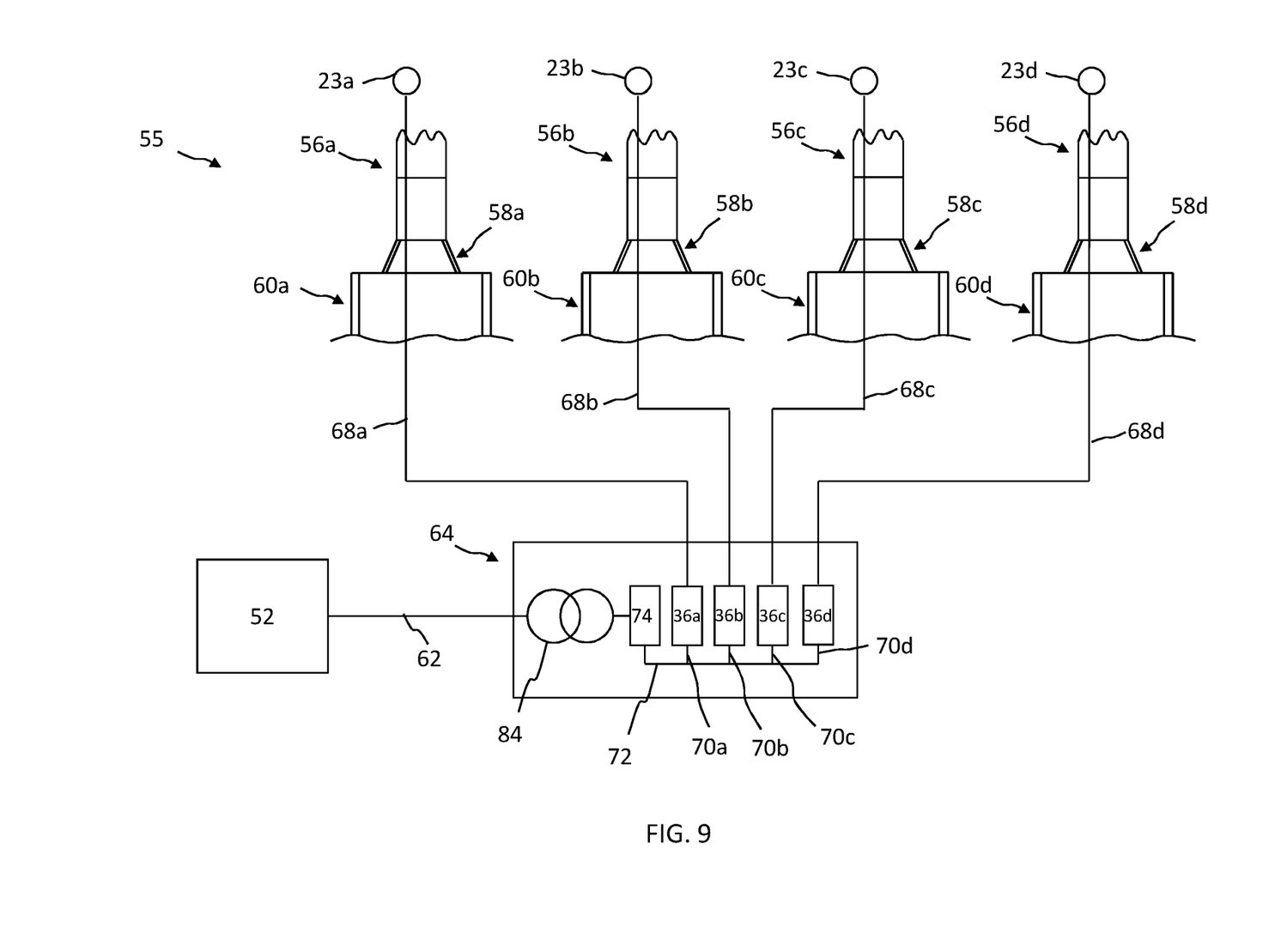

FIG. 9 shows a wind power plant 55 according to another embodiment of the invention. This embodiment is similar to the previous embodiment shown in FIG. 8 save that the power cables 68*a*-68*d* connect the generators 23*a*-23*d* of the wind turbines 56*a*-56*d* to respective switchgear devices 36*a*-36*d* on the connection station 64 such that an AC output from the generator is transferred untransformed to the step-up transformer 84. This arrangement removes the need for separate transformations and/or power converters 25 within each wind turbine 56*a*-56*d*, but replaces them with centralised versions of these functional components. Alternatively, the wind turbines 56*a*-56*d* each may have respective power converters 25 positioned between the generators 23*a*-23*d* and respective switchgear devices 36*a*-36*d* on the connection station 64.

The skilled reader will appreciate that modifications may be made to the specific embodiments of the wind power plants 55 described above without departing from the inventive concept as defined in the appended claims, and that other embodiments of the wind power plant 55 in accordance with the inventive concept are also envisaged. For example, an embodiment is envisaged that is largely the same as the earlier embodiment shown in FIG. 5 save that the wind turbines themselves also include respective switchgear devices, similar to the wind turbine shown in FIG. 1. In this embodiment, the each of the power cables directly connects a single switchgear device on the connection station to a respective wind turbine via the switchgear device housed within the wind turbine.

Also, the connection station 64 may comprise an auxiliary power supply to supply power to at least one of the wind turbines 56a-56d. The auxiliary power supply may be used to power the wind turbines 56a-56d before they are fully commissioned and/or under certain start-up conditions.

Further, each of the power cables 68a-68b may comprise a communication line configured to send control signals, issued by respective controllers on the wind turbines 56a-56d, to its respective switchgear device 36a-36d held on the connection station 64 in order to trigger the circuit breaker panel 80 when necessary, such as in the event of the fault. In some embodiments, the communication lines are fibre optic cables, ensuring fast communication between the wind turbines 56a-56d and their respective circuit breaker panels 80.

The invention has been described with reference to a particular embodiment thereof in order to illustrate the principles of operation. The above description is thus by way of illustration and directional references and any other terms having an implied orientation refer only to the orientation of the features as shown in the accompanying drawings. They should not be read to be requirements or limitations; particularly as to the position, orientation, or use of the invention unless specifically set forth in the appended claims. Connection references (e.g., attached, coupled, connected, joined, secured and the like) are to be construed broadly and may include intermediate members between a connection of elements and relative movement between elements. As such, connection references do not necessarily infer that two elements are directly connected and in fixed relation to each other, unless specifically set forth in the appended claims.

The invention claimed is:

1. A wind power plant comprising:
a plurality of wind turbines connected to a distribution line;
a connection station comprising a plurality of switchgear devices connected to a substation via the distribution line; and
a plurality of power cables connecting the plurality of switchgear devices and the plurality of wind turbines such that the plurality of switchgear devices and the plurality of wind turbines are respectively connected in one-to-one relationships and so that the plurality of wind turbines are electrically isolated from one another so that, when one of the plurality of wind turbines is disconnected from the connection station, other ones of the plurality of wind turbines remain connected.

2. The wind power plant of claim 1, wherein the connection station further comprises a primary switchgear device connecting the plurality of switchgear devices and the distribution line.

3. The wind power plant of claim 1, wherein at least one wind turbine of the plurality of wind turbines comprises a connection box and wherein at least one power cable of the plurality of power cables directly connects a single switchgear device of the plurality of switchgear devices and the at least one wind turbine via the connection box.

4. The wind power plant of claim 1, wherein at least one wind turbine of the plurality of wind turbines comprises a switchgear device and wherein at least one power cable of the plurality of power cables directly connects a single switchgear device of the plurality of switchgear devices and the at least one wind turbine via the switchgear device.

5. The wind power plant of claim 1, wherein the connection station further comprises a step-up transformer connecting the plurality of switchgear devices and the distribution line.

6. The wind power plant of claim 5, wherein the step-up transformer is rated at 66 kV or greater.

7. The wind power plant of claim 5, wherein power equipment in the plurality of wind turbines is rated at 36 kV or lower.

8. The wind power plant of claim 5, wherein at least one power cable of the plurality of power cables directly connects a single switchgear device of the plurality of switchgear devices and a generator of a wind turbine of the plurality of wind turbines such that an AC output from the generator is transferred untransformed to the step-up transformer.

9. The wind power plant of claim 1, wherein each power cable comprises three cores with a cross-sectional area of 0.000095 m$^2$ 0.00012 m$^2$ or 0.00015 m$^2$.

10. The wind power plant of claim 1, wherein the connection station further comprises an auxiliary power supply configured to supply power to at least one wind turbine of the plurality of wind turbines.

11. The wind power plant of claim 1, wherein the wind power plant is an offshore wind power plant and wherein the connection station is located on a floating platform.

12. The wind power plant of claim 1, wherein the wind power plant is an offshore wind power plant and wherein the connection station is located on a monopile or a jacket comprising three or four anchoring points.

13. The wind power plant of claim 1, wherein the plurality of power cables each comprise a communication line configured to send control signals to its respective switchgear device.

14. The wind power plant of claim 13, wherein the communication lines are fibre optic cables.

15. A connection station, comprising:
a plurality of switchgear devices connected to a substation via a distribution line;
a plurality of power cables connecting the plurality of switchgear devices and a plurality of wind turbines, wherein each of the plurality of power cables is respectively arranged to connect a single switchgear device of the plurality of switchgear devices and a single wind turbine of the plurality of wind turbines; and
a step-up transformer connecting the plurality of switchgear devices and the distribution line, and
wherein at least one power cable of the plurality of power cables directly connects a single switchgear device of the plurality of switchgear devices and a generator of a wind turbine of the plurality of wind turbines such that an AC output from the generator is transferred untransformed to the step-up transformer.

16. The connection station of claim 15, wherein the connection station further comprises a primary switchgear device connecting the plurality of switchgear devices and the distribution line.

17. The connection station of claim 15, wherein at least one wind turbine of the plurality of wind turbines comprises a connection box and wherein at least one power cable of the plurality of power cables directly connects a single switchgear device of the plurality of switchgear devices and the at least one wind turbine via the connection box.

18. The connection station of claim 15, wherein at least one wind turbine of the plurality of wind turbines comprises a switchgear device and wherein at least one power cable of the plurality of power cables directly connects a single switchgear device of the plurality of switchgear devices and the at least one wind turbine via the switchgear device.

19. The connection station of claim 15, wherein the connection station further comprises a step-up transformer connecting the plurality of switchgear devices and the distribution line.

20. A power generation system, comprising:
- a plurality of wind turbines connected to a distribution line;
- a connection station comprising a plurality of switchgear devices connected to a substation via the distribution line; and
- a plurality of power cables arranged in a parallel configuration and connecting the plurality of switchgear devices and the plurality of wind turbines in such a way that the plurality of switchgear devices and the plurality of wind turbines are respectively connected in one-to-one relationships and so that the plurality of wind turbines are electrically isolated from one another so that, when one of the plurality of wind turbines is disconnected from the connection station, other ones of the plurality of wind turbines are not disconnected.

* * * * *